(12) United States Patent
Havekost et al.

(10) Patent No.: US 7,023,440 B1
(45) Date of Patent: Apr. 4, 2006

(54) METHODS AND APPARATUS FOR INTEGRATED DISPLAY OF PROCESS EVENTS AND TREND DATA

(75) Inventors: Robert B. Havekost, Elgin, TX (US); Larry Oscar Jundt, Round Rock, TX (US); Roy Faltesek, Round Rock, TX (US); Ian James Nadas, Austin, TX (US)

(73) Assignee: Fisher Rosemount Systems, Inc., Austin, TX (US)

( * ) Notice: Subject to any disclaimer, the term of this patent is extended or adjusted under 35 U.S.C. 154(b) by 746 days.

(21) Appl. No.: 09/378,969

(22) Filed: Aug. 23, 1999

Related U.S. Application Data

(60) Provisional application No. 60/100,286, filed on Sep. 14, 1998.

(51) Int. Cl.
*G06T 11/20* (2006.01)

(52) U.S. Cl. .................................................. 345/440

(58) Field of Classification Search ................ 345/440, 345/440.1; 702/67, 68; 714/26, 46; 706/914
See application file for complete search history.

(56) References Cited

U.S. PATENT DOCUMENTS

| | | | | |
|---|---|---|---|---|
| 4,718,025 A | * | 1/1988 | Minor et al. ............ | 345/440 X |
| 5,226,118 A | * | 7/1993 | Baker et al. ............ | 345/440 X |
| 5,257,206 A | * | 10/1993 | Hanson ..................... | 700/273 |
| 5,440,478 A | | 8/1995 | Fisher et al. ............. | 364/188 |
| 5,768,148 A | * | 6/1998 | Murphy et al. .......... | 345/759 |
| 6,229,536 B1 | * | 5/2001 | Alexander et al. ....... | 345/440 |

FOREIGN PATENT DOCUMENTS

| | | |
|---|---|---|
| EP | 0 434 050 A2 | 6/1991 |
| EP | 0 434 050 A3 | 6/1991 |
| EP | 0 508 386 A2 * | 10/1992 |
| EP | 0 508 386 A3 | 10/1992 |
| GB | 2 329 726 A | 3/1999 |

* cited by examiner

*Primary Examiner*—Amr A. Awad
*Assistant Examiner*—Chanté Harrison
(74) *Attorney, Agent, or Firm*—Wolf, Greenfield & Sacks, P.C.

(57) ABSTRACT

A method and apparatus for the integrated display of process events and trend data. The method and apparatus provide for a unified display of trend data and process events related to the control and/or monitoring of a manufacturing process. A workstation generates and displays a trend chart that represents values of one or more selected process parameters during a selected time window. The workstation also generates and displays an event table containing information describing process events that are related to the selected process parameters and that occurred during the selected time window.

24 Claims, 14 Drawing Sheets

METHODS AND APPARATUS FOR INTEGRATED DISPLAY OF PROCESS EVENTS AND TREND DATA

CROSS REFERENCE TO RELATED APPLICATIONS

This application claims the benefit under 35 U.S.C. §119 (e) of prior filed provisional application No. 60/100,286, filed Sep. 14, 1998 and entitled Methods and Apparatus for Integrated Display of Process Events and Trend Data which is incorporated herein by reference.

FIELD OF THE INVENTION

This invention relates to computerized systems for controlling and/or monitoring manufacturing processes and, more particularly, to methods and apparatus for generating an integrated display of process events and trend data.

BACKGROUND OF THE INVENTION

Computerized systems for controlling and/or monitoring manufacturing processes, such as, for example, chemical processes, oil refining, production of pulp and paper, food processing and the like, are well-known in the art. Such systems typically include a network of computer workstations, process controllers and I/O subsystems. The I/O subsystems acquire process information from various sensors and other devices in the processing plant. The workstations organize the process information and present it to a user in a way that permits efficient control and monitoring of the manufacturing process. These systems may perform control functions, monitoring functions, or both. For simplicity, such systems are referred to herein as "process control" systems, despite the fact that they may perform control functions, both control and monitoring functions or only monitoring functions.

Process control systems typically manage both "current" process values (very recent measurements of temperatures, flow rates, pressures, tank levels, desired control set points, valve positions, motor states, etc.) and "historical" process values (measurements or control variable values associated with a specific time in the past). Typically, process data measurements and control variables may be represented by numerical values (e.g., 500 psi, 14.4 gallons per minute). However, some process measurements are more easily understood by process control system operators as words (e.g., OFF, OPEN, PV-HELLO) or strings of words (e.g., "sequence active", "failed to open"). Process control systems typically include one or more applications that provide displays of numerical historical process values. Typically, these displays include a "numeric value vs. time" graph, often referred to as a "trend chart," because the multi-segment line connecting the numeric values plotted as a function of time indicates the general direction of the measurement over the period of time represented on the display.

Process control systems also typically manage significant "process event" occurrence information. These process event occurrences record the fact that an event of interest occurred in the control system (e.g., an alarm state was detected, an operator changed the value of a control variable, a hardware fault was detected in the process control system, etc.) at a specific point in time. Process control systems typically include one or more applications that provide a display of process event information. Typically, this kind of information is printed on a logging printer soon after the event is detected. The process event information may be stored and can be displayed by applications that allow viewing of event records in various ways (e.g., ordered by time of occurrence and/or data filtering to display only those records that have certain properties or fields with certain values).

In prior art systems, separate process control applications must be used to display historical process values and process event records. This is a significant disadvantage to users trying to understand the operation of the system through examination of these two types of historical data. Even if the user has developed skills in the use of the individual applications, significant additional skill is typically required to manually coordinate and combine the information from the multiple applications to accurately answer questions about the behavior of the process control system. Typically, combining historical process values and event record information in a single view that can be printed and stored or used in correspondence with other process control personnel has required extensive computer skills with many applications. This has meant that this capability is beyond the ability of many process operators, and only highly trained process engineers can perform these tasks. Thus, the cause/effect relationship to process control is typically beyond the reach of process operators, and opportunities for making improvements in the process control system or in the standard operating procedures for a process plant are overlooked, or are too time-consuming to pursue.

SUMMARY OF THE INVENTION

According to one aspect of the present invention, methods and apparatus are provided for displaying process information in a process control and/or monitoring system comprising a workstation having a display screen and a process history view application, a controller and an I/O subsystem. The workstation generates and displays on the display screen a trend chart that represents values of one or more selected process parameters during a selected time window, in response to user configuration of the trend chart. The workstation also generates and displays on the display screen an event table containing information describing process events that are related to the selected process parameters and that occurred during the selected time window.

The trend chart may be a graph of the selected process parameters as a function of time. The event table may be automatically generated and displayed upon configuration of the trend chart by the user. The trend chart and the event table may be displayed simultaneously on the same display screen to form an integrated process history chart.

Preferably, event markers of the process events in the event table are displayed on the trend chart. The event markers may comprise event names at points on the trend chart corresponding to the time of each event.

The user may configure the trend chart to display different time windows, different process parameters and different numbers of parameters. In each case, the process history application in the workstation automatically retrieves the process data from the appropriate data source, determines the data type for the trend chart and automatically retrieves event records to be displayed in the event table.

Trend chart configurations may be stored for later use. When the stored trend chart configuration is selected by the user, the process history view application automatically retrieves the required process data and process event records in order to generate the trend chart and the corresponding event table.

The process history view application provides the ability to establish filter criteria for events to be displayed in the event table. The user may select event types and categories for display. In addition, the user may select events from certain areas, nodes and modules of the process control system. In each case, the selected events, according to the filter criteria established by the operator or in accordance with default filter criteria, for the selected time window are displayed in the event table. The user may change the filter criteria in order to add process events of possible interest or to remove process events that are not of interest.

As indicated above, the trend chart preferably includes event markers that indicate the occurrence of events at specific times during the selected time window. The user may select one of the events on the trend chart, such as by positioning a cursor on the event marker of interest and clicking a pointing device. In response, the process history view application scrolls the event table to the selected event, if necessary, and highlights the selected event. This permits the user, for example, to determine the details of an event that occurred at a particular time in the trend chart, such as when a change occurred in one of the process parameters. Alternatively, the user may select an event in the event table. In response, the process history view application highlights the selected event marker in the trend chart. This function permits the user to easily correlate changes in process parameters with process events.

The process history view application therefore provides a high degree of integration and interaction between the trend chart and the event table. The user can easily determine relationships between trend data and process events.

In another embodiment, a graphical user interface for displaying trend and event data related to the operation of a process is disclosed. The interface includes first and second portions. The first portion is configured to display at least one trend graph that displays trend lines representative of at least one parameter associated with the process. The second portion configured to display information about at least one process event. The interface also includes event markers related to the at least one process event and displayed on the first portion.

In another embodiment, a system for monitoring a process is disclosed. The system includes an event database containing event records related to the process, a trend database containing historical trend data related to the process, and means for simultaneously displaying a trend graph representing at least a portion of the historical trend data and a table representing at least a portion of the event records.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
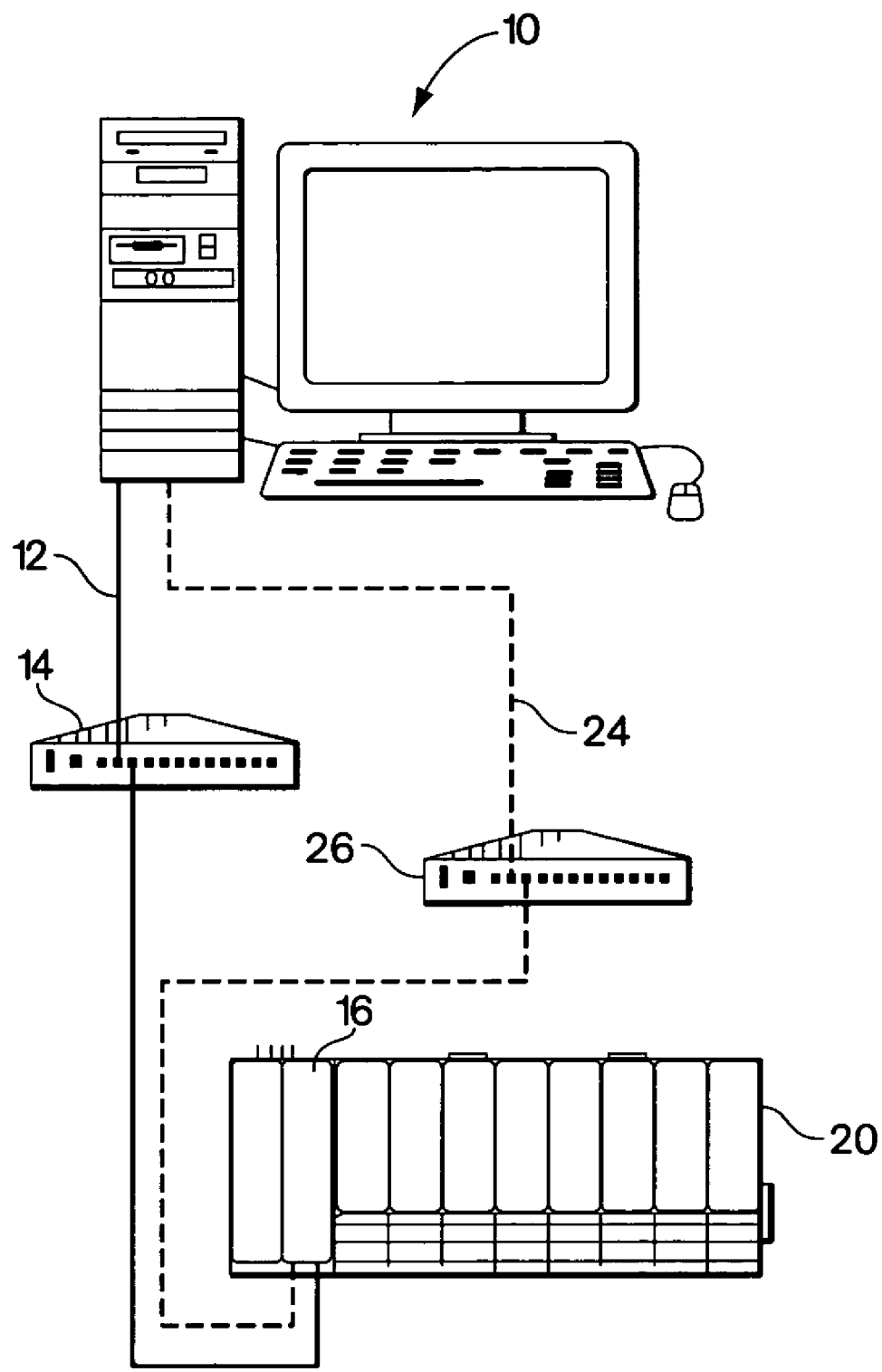
FIG. 1 is a block diagram of the hardware components of an example of a process control system.

A block diagram of an example of a process control system suitable for implementation of the present invention is shown in FIG. 1. A workstation 10 is coupled to a primary control network 12. The primary control network 12 is coupled by a primary hub 14 to a process controller 16 which controls an I/O subsystem 20. The I/O subsystem 20 is connected to and acquires process information from process sensors and other devices in the processing plant. The workstation 10 may have the capability to access controller 16 through a secondary control network 24 and a secondary hub 26. It will be understood that a typical process control system includes a plurality of workstations, control networks, hubs, controllers and I/O subsystems connected together in a network configuration.

A typical workstation 10 may comprise a PC running Windows NT and having a 3 gigabyte hard drive, 128 megabytes of main memory and a printer. It will be understood by those skilled in the art that a variety of different workstation configurations may be utilized within the scope of the invention.

The present invention relates to application software that is implemented in one or more of the workstations in the process control system. The application software coordinates and processes trend data and process events acquired by the control system to produce a unique and advantageous display on the workstation display screen. The application software, known as the process history view application, is preferably implemented in the C++ programming language, but may be implemented in other programming languages within the scope of the invention.

Figure 2:
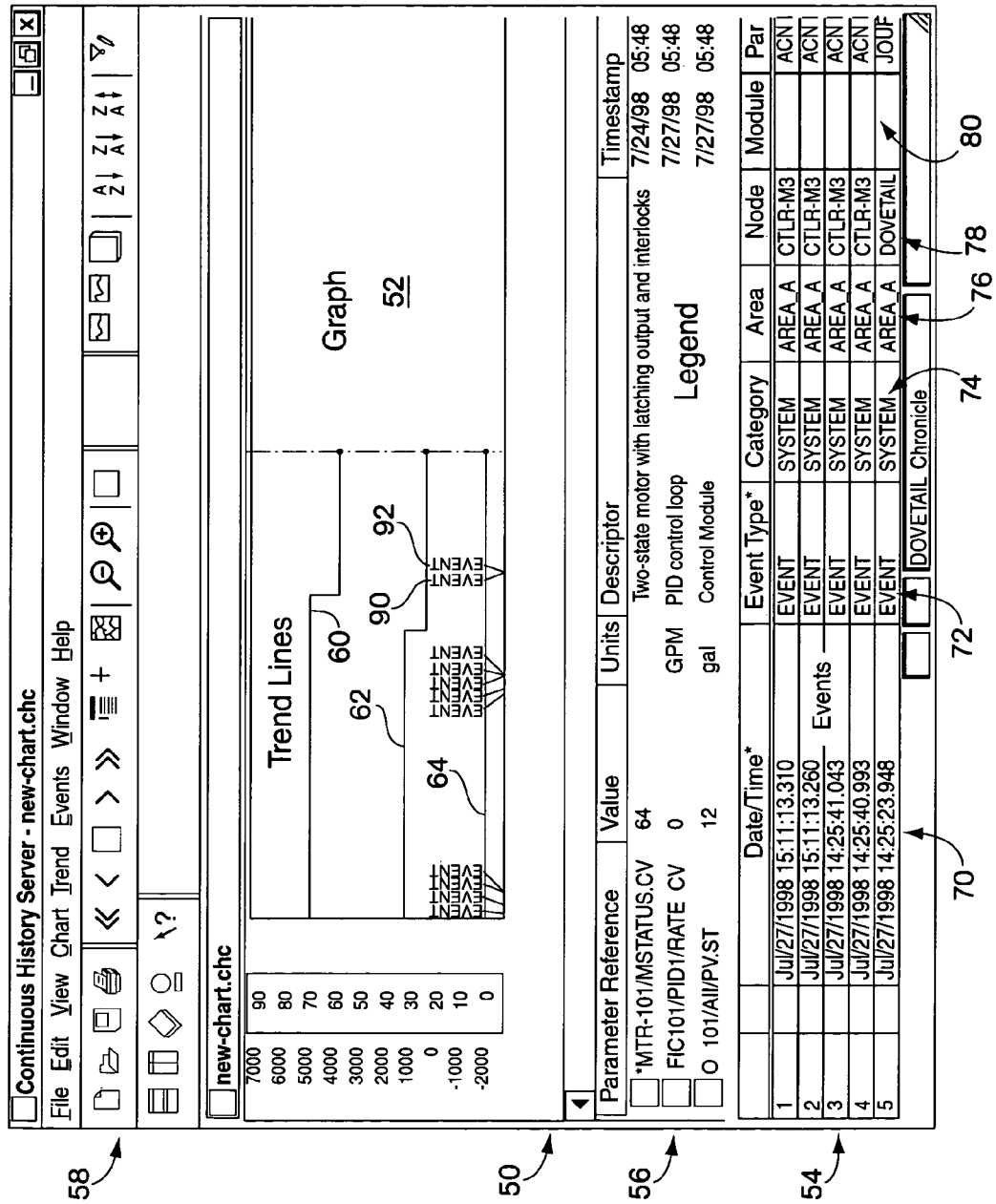
FIG. 2 shows an example of a process history chart that may be displayed on a display screen of the workstation in the process control system.

An example of a process history chart 50 in accordance with the invention is shown in FIG. 2. The process history chart may occupy all or a part of the video display screen of workstation 10. The major components of process history chart 50 include a trend chart 52 and an event table 54. A legend 56 is associated with trend chart 52. The legend 56 provides information concerning each parameter that appears in trend chart 52. A menu bar 58 permits user selection of various functions associated with process history chart 50. As described below, trend chart 52 and event table 54 are integrated together, and changes in one display element are automatically reflected in the other element of the display.

Trend chart 52 is a representation of the values of one or more process parameters over a selected time window. Trend chart 52 may comprise a graph of the values of one or more selected process parameters as a function of time over the selected time window. In the example of FIG. 2, trend lines 60, 62 and 64 represent the values of three process parameters over a period of several hours. Three Y-axis scales correspond to trend lines 60, 62, and 64, respectively. The Y-axis scales may be correlated to the respective trend lines, for example, by color. In one embodiment of the process history view application, up to eight process parameters may be displayed on the trend chart 52. The time window of the trend chart may be selected by the user. The time window may be a selected historical time span or may extend from a selected time to the present. When the trend chart extends to the present, the operator may observe the trend lines as corresponding process parameter values are acquired by the process control system. Legend 56 provides information as to each of the process parameters that appear in trend chart 52.

Event table 54 includes a listing of process events that occurred during the time window of trend chart 52 and which are retrieved for display in accordance with operator selected filter settings or default filter settings. Event records may include different information in different processing plants. In one embodiment, event records include a date and time 70, an event type 72, a category 74, an area 76, a node 78 and a module 80. The categories may, for example, include "instrument", "process", "system", and "user". The area may indicate the area in the plant where the event occurred. The node may indicate the name of the network node where the event was detected. The module may indicate a software module. Additional information may be included in the event records. Examples of such information include parameter, state, level and descriptive fields. The event table is typically organized as a spreadsheet and is typically sorted in chronological order. Other sorting criteria may be selected, if desired.

Referring again to FIG. 2, the trend chart 52 preferably includes event markers 90, 92, etc. Each event marker may comprise a word indicating the event type and a line that points to the time on the X-axis time scale when the event occurred. Only those events which appear in event table 54 are indicated on trend chart 52. The event markers 90, 92, etc. enable the user to easily correlate a change in one of the trend lines 60, 62, 64 to an event, or vice versa.

The process history chart may include menu bar 58 for selecting a variety of functions relating to the chart. The menu bar may, for example, include buttons for opening a new process history chart, opening an existing process history chart, saving a process history chart, printing the current process history chart, opening the edit filters dialog box, and the like.

Figure 3:
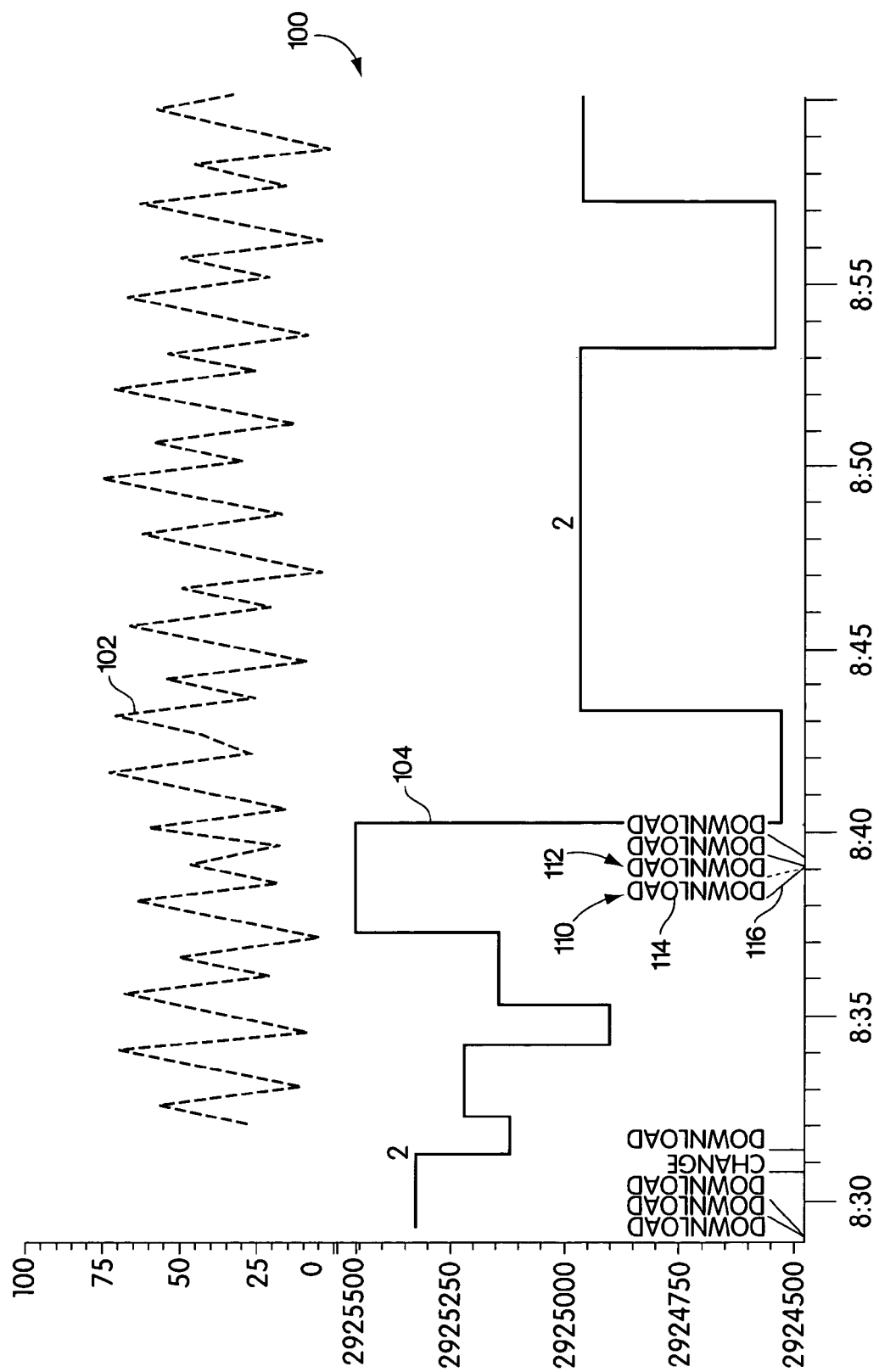
FIG. 3 shows another example of a trend chart that may be displayed in the process history chart of FIG. 2.

A second example of a trend chart which may be incorporated in the process history chart of FIG. 2 is shown in FIG. 3. A trend chart 100 comprises graphs of two process parameters as a function of time. Trend lines 102 and 104 are plotted over a selected time window of approximately ½ hour (X-axis time scale from 8:30 to 8:55). The Y-axis is divided into two separate scales so that trend lines 102 and 104 are vertically separate from each other. In one embodiment, the trend chart may have up to six separate Y-axes. Event markers 110, 112, etc. correspond to events in the event table 54, as described above in connection with FIG. 2. Each event marker includes a word 114 that indicates the event type and a line 116 that points to the time of occurrence of the event on the X-axis time scale.

Figure 4A:
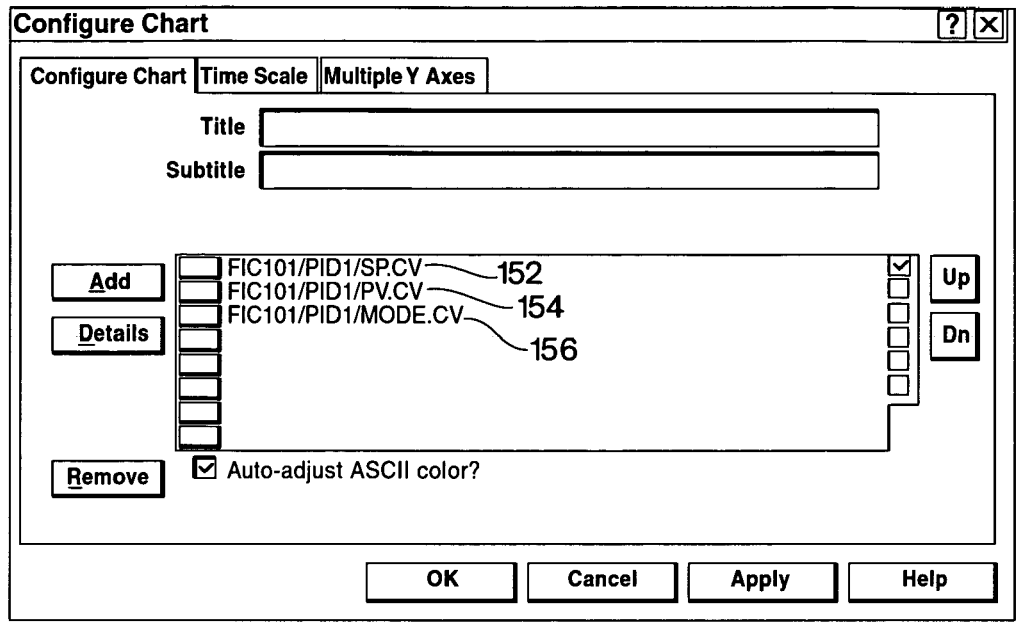
FIGS. 4A–4D show dialog boxes for configuring the trend chart in accordance with the invention.
Figure 4B:
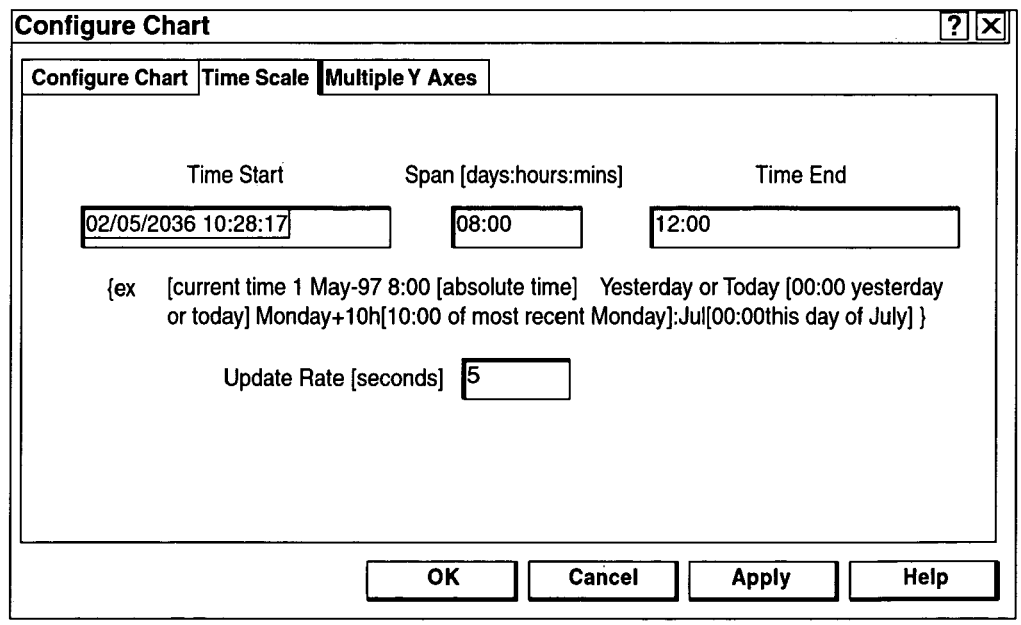
Figure 4C:
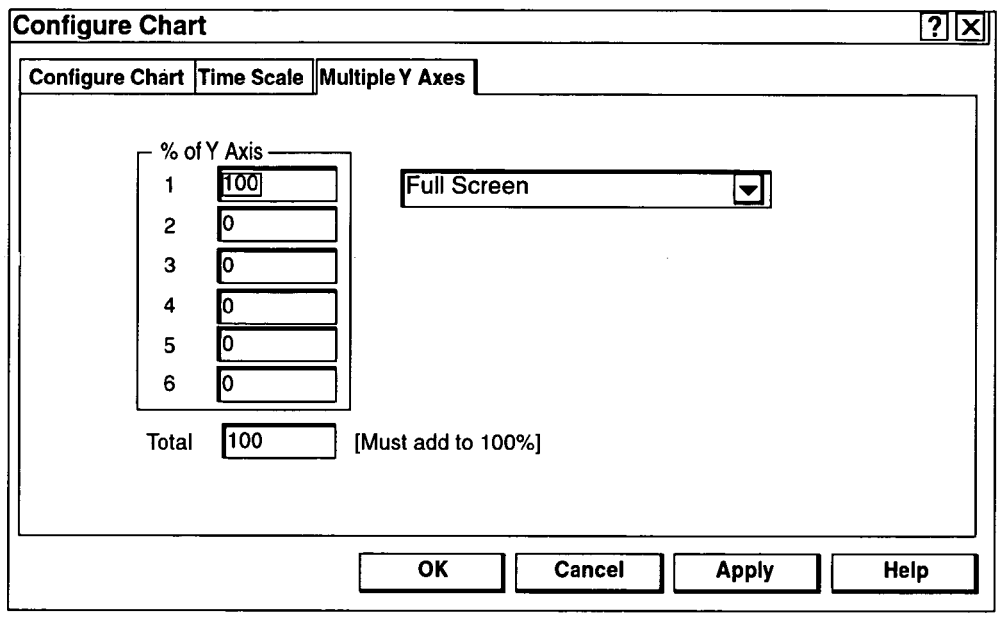
Figure 4D:
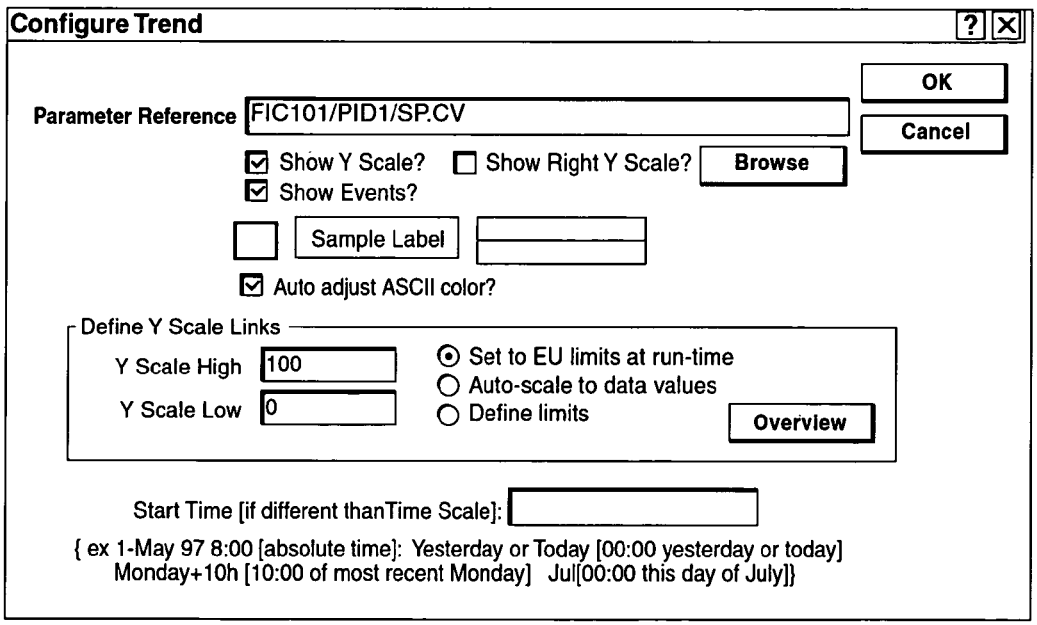

FIGS. 4A–4D show "configure chart" dialog windows for user configuration of the trend chart in the process history chart in accordance with the invention. A configure chart window 150 shown in FIG. 4A. permits the user to add process parameters to the trend chart and to delete process parameters from the trend chart. In the example of FIG. 4A, process parameters 152, 154 and 156 are selected. For each selected process parameter, the user may specify whether a new Y-axis is desired (see FIG. 3 which shows two Y-axes). A time scale selection window 160 is shown in FIG. 4B. The user may select a time window by specifying the "time start", the span and the "time end". In addition, the user may specify the update rate of the process parameter values. A window 170, shown in FIG. 4C, permits the user to specify multiple Y-axes. The percentage of the total Y-axis occupied by each parameter value is specified. In the example of FIG. 2, a single Y-axis occupies 100% of the available space. In the example of FIG. 3, two Y-axes each occupy approximately 50% of the available space. A window 180, shown in FIG. 4D, permits the user to individually configure the trend line corresponding to each selected process parameter. The user can, for example, specify whether the Y scale is shown, whether events corresponding to the process parameter are shown and can define Y scale limits. It will be understood that a variety of different trend chart configuration options may be specified in accordance with the present invention. The characteristics shown in FIGS. 4A–4D and described above, as well as additional trend chart characteristics, may be selected by the user.

When the trend chart has been configured by the user, the process history view application automatically locates and retrieves the data values needed to generate and display the trend chart. In addition, the process history view application automatically locates and retrieves the process event records to be displayed in the event table. The process event records to be displayed in the event table are retrieved in accordance with selected filter settings. Preferably, process events that occurred during the time window specified for the trend chart and which are related to the process parameters in the trend chart are displayed. The process events to be displayed in the event table of the process history chart may be defined by default filter settings or by user-selected filter settings. Default filter settings may, for example, include the time window of the trend chart and those events that occurred in the same process control system module as the process parameters displayed in the trend chart.

Figure 5A:
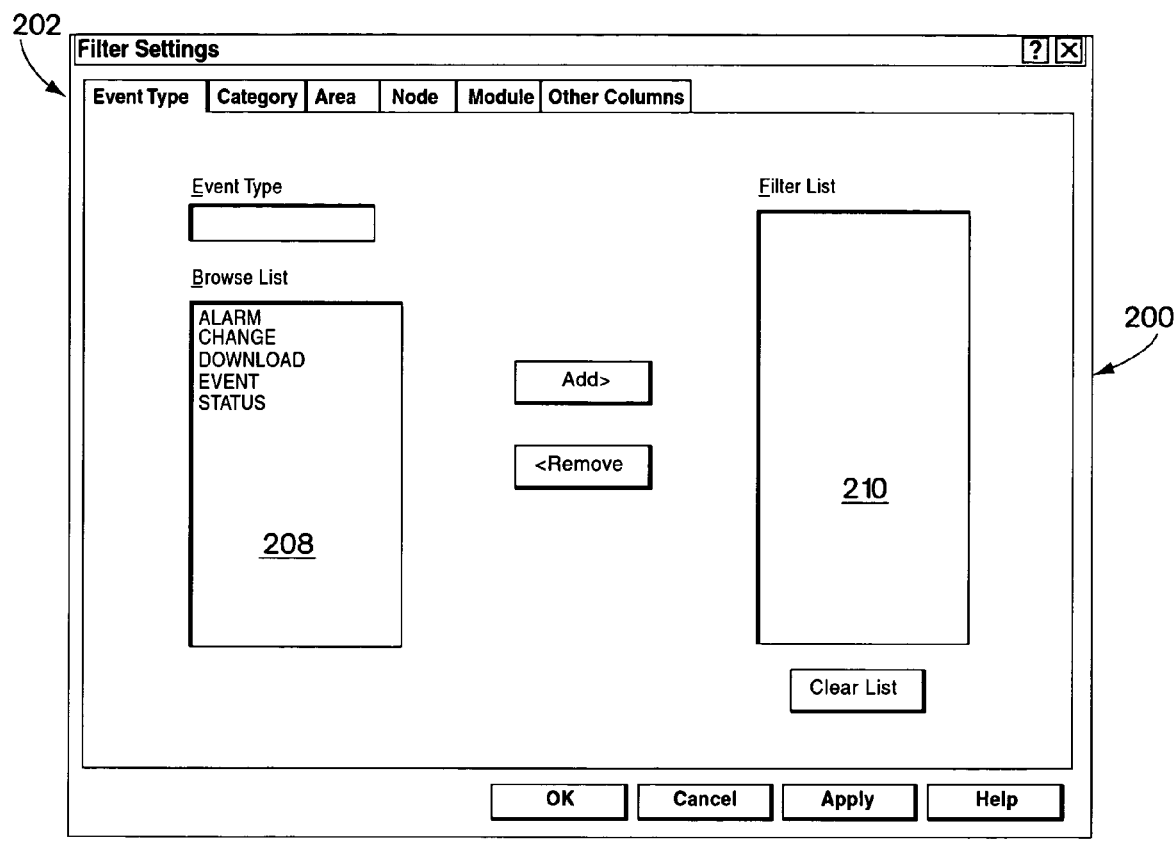
FIGS. 5A–5F show dialog boxes that may be used for selecting process event filter settings.
Figure 5B:
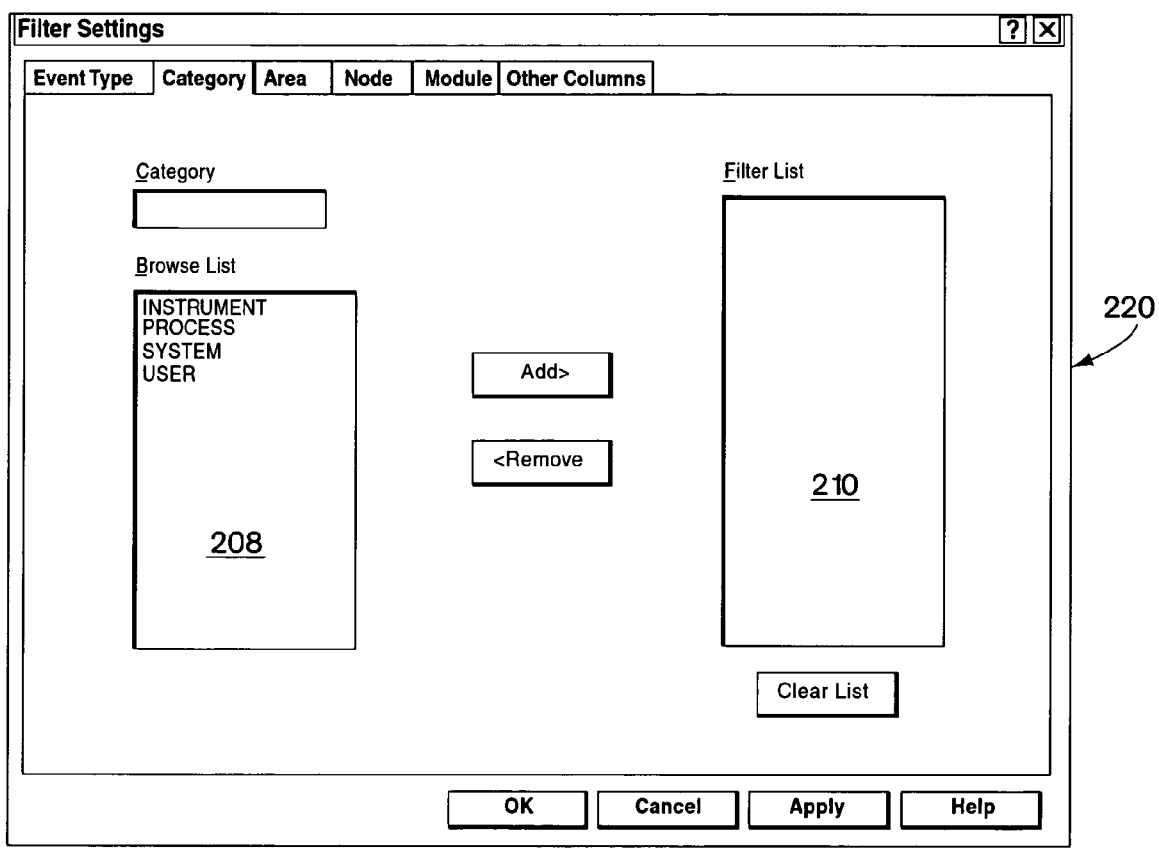
Figure 5C:
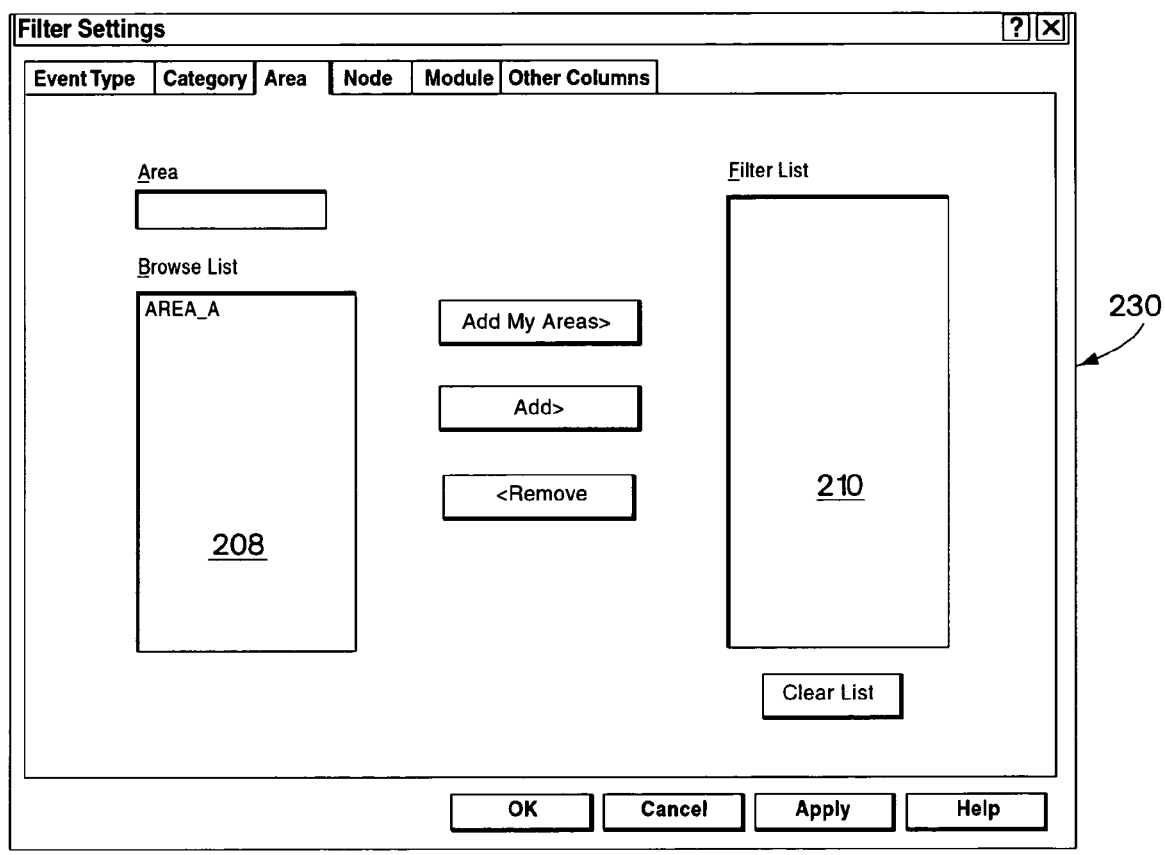
Figure 5D:
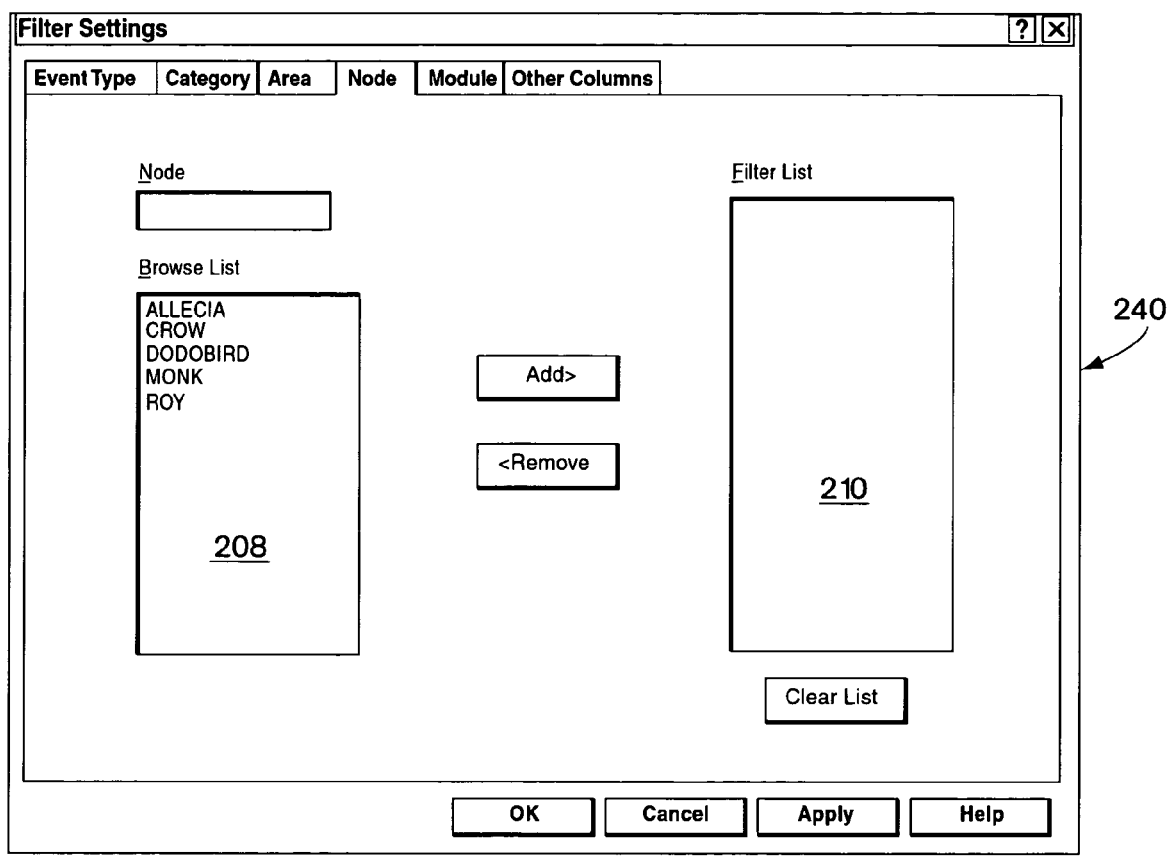
Figure 5E:
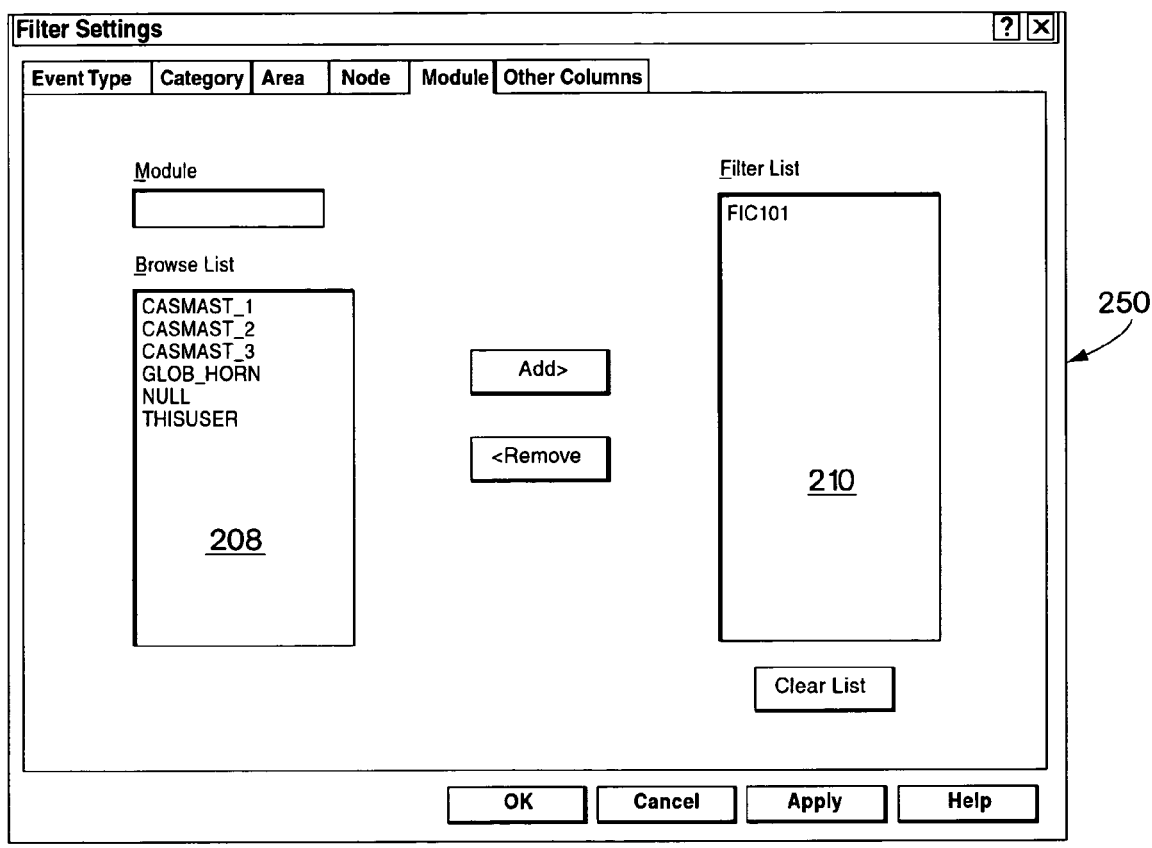
Figure 5F:
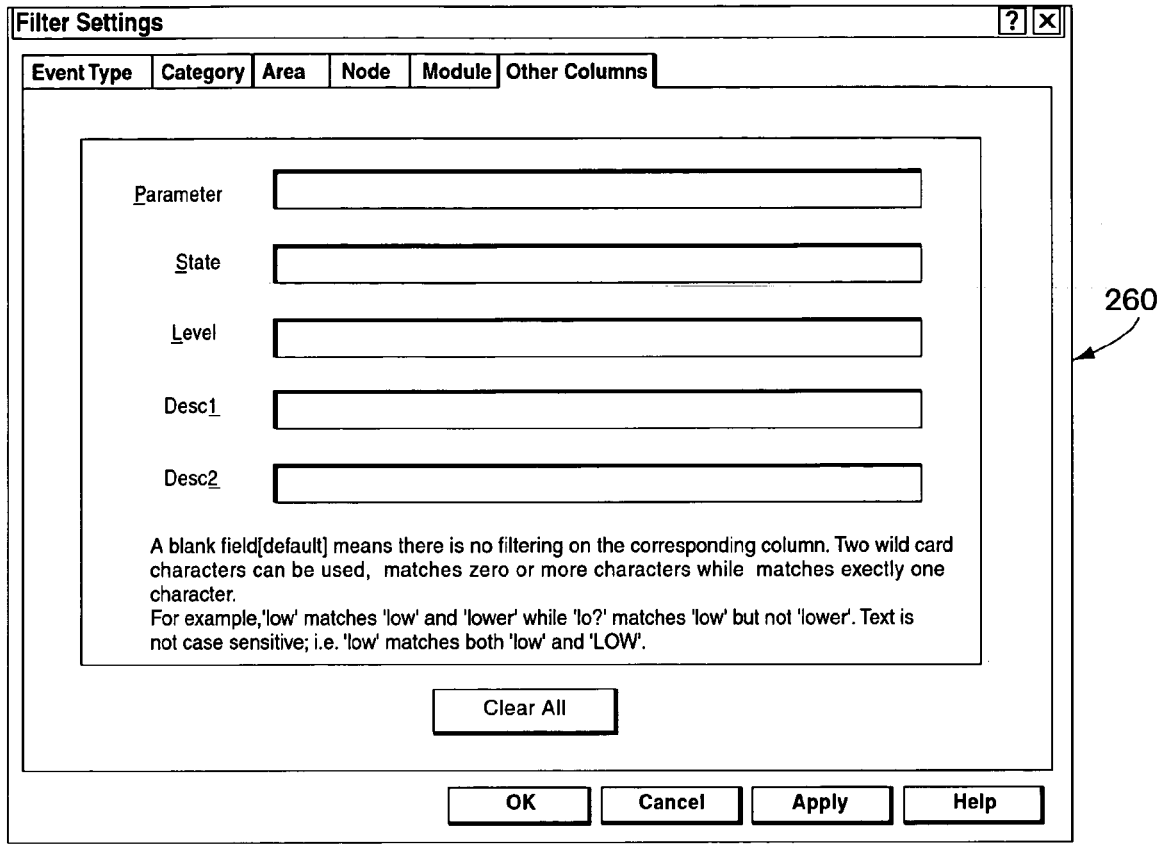

Examples of dialog boxes which permit the user to select filter settings are shown in FIGS. 5A–5F. In each case, the user selects process events for display in the event table. Typically the events are selected as providing information that may be useful in connection with the trend chart. Referring to FIG. 5A, a dialog window 200 permits the user to select one or more event types for display in the event table. Dialog window 200 includes a menu bar 202 for selection of the process event characteristic of interest. In the illustrated example, process event characteristics include event type, category, area, node, module and other columns. Dialog window 200 further includes a browse list 208 and a filter list 210. Browse list 208 contains a list of items for selection by the user. Filter list 210 contains the items that have been selected by the user. In the example of FIG. 5A, event types include alarm, change, download, event and status. The user selects one or more event types and places them in filter list 210. The selected event types will then be displayed in the event table of the corresponding process history chart. A dialog box 220 for selection of event category is shown in FIG. 5B. Categories in the browse list include instrument, process, system and user. A dialog box 230 for selection of event area is shown in FIG. 5C. The event area may be a physical area of the manufacturing plant. A dialog box 240 for selection of one or more nodes is shown in FIG. 5D. Each node is a network node connected to a workstation or a process controller. A dialog box 250 for selection of modules is shown in FIG. 5E. Each module represents a software module in a workstation or a controller. A dialog box 260 for selection of other event characteristics in the event record is shown in FIG. 5F. The user may specify that events having selected characteristics be displayed in the event table.

Figure 5G:
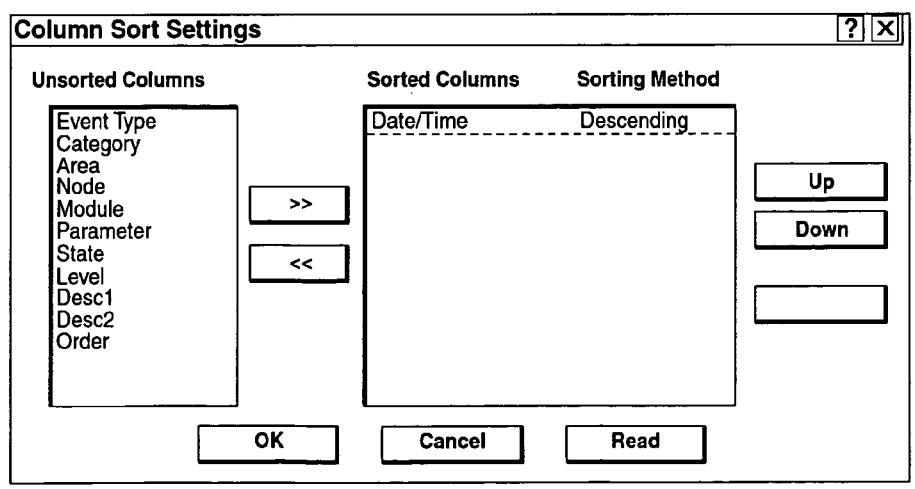
FIG. 5G shows a dialog box that may be used for establishing the order of events in the event table.

A dialog box 270 shown in FIG. 5G permits the user to specify the arrangement of the event records in the event table. Thus, for example, events may be sorted by event type or node. Typically, events are listed chronologically by date and time, according to a default setting.

Figure 6:
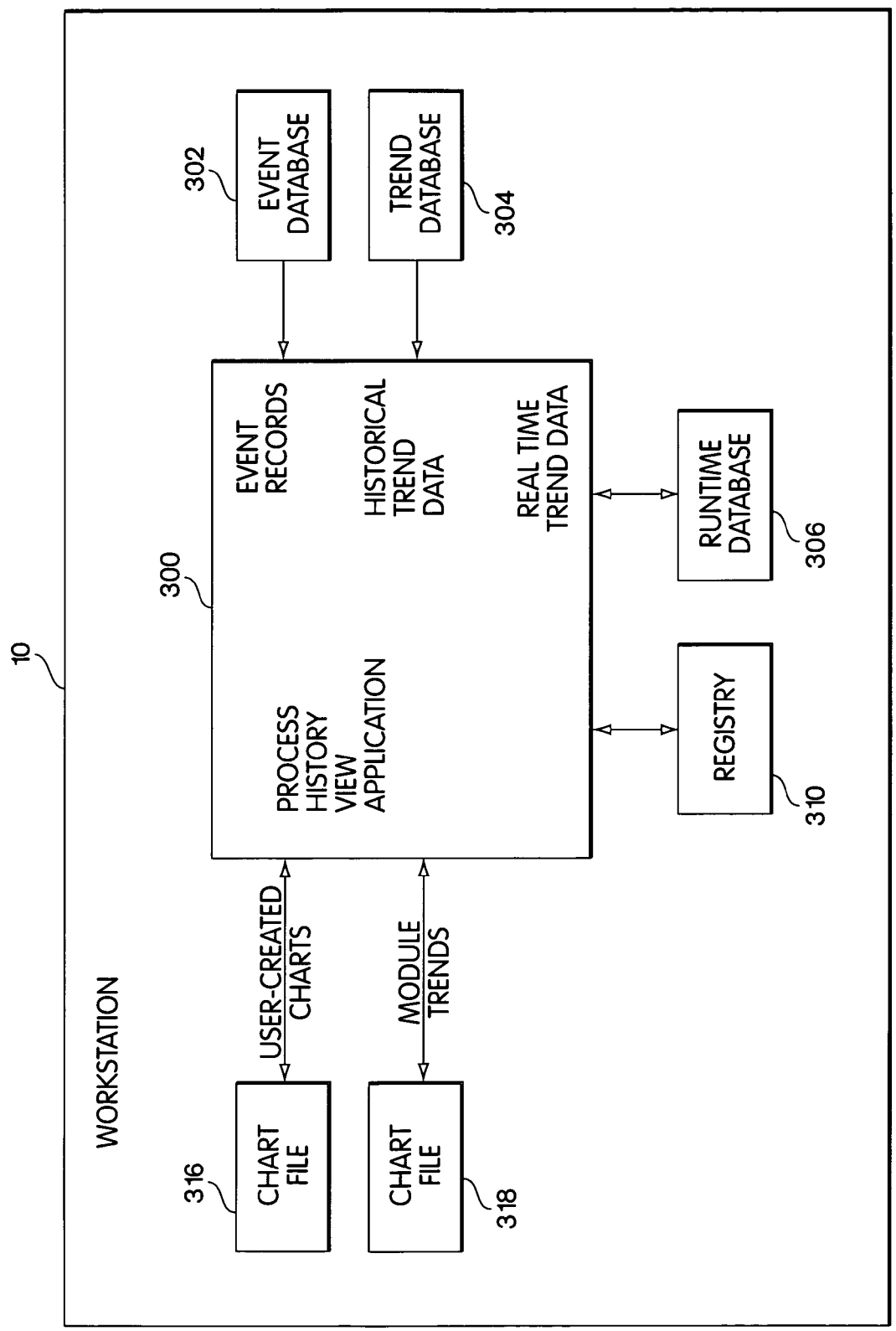
FIG. 6 is a pictorial representation of the interaction between the process history view application and other modules in the workstation.

A schematic diagram showing the relationship between the process history view application 300 and other components of workstation 10 is shown in FIG. 6. As indicated above, the process history view application 300 automatically retrieves event records from an event database 302 and retrieves historical trend data from a trend database 304 in accordance with the user-specified configuration of the process history chart. Real-time trend data, that is current trend data, is retrieved from a runtime database 306. A registry 310 contains application settings and user preferences. For example, the user may specify font type and font size to be used in the process history view and may specify the way that time is indicated on the trend chart. User-created process history charts may be saved in chart file 316 for later use. The file contains information concerning the trend chart configuration and the filter settings. When the saved chart is later opened, the required trend data and process event records are automatically retrieved and inserted into the chart, so as to generate the required display. In addition, module trend charts may be stored in a chart file 318.

Figure 7:
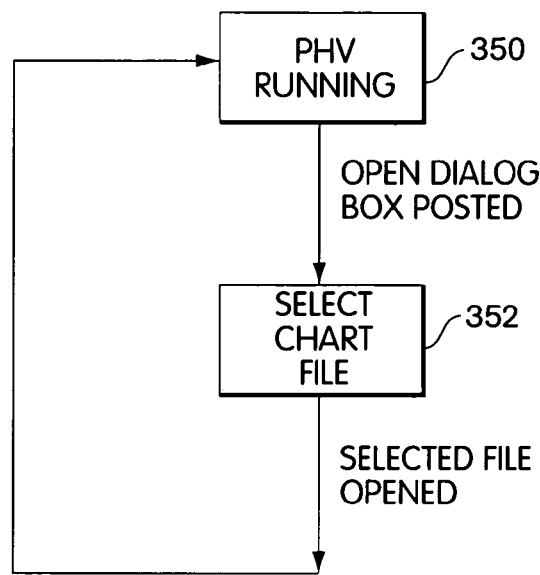
FIG. 7 is a flow chart that illustrates opening of an existing process history chart.
Figure 8:
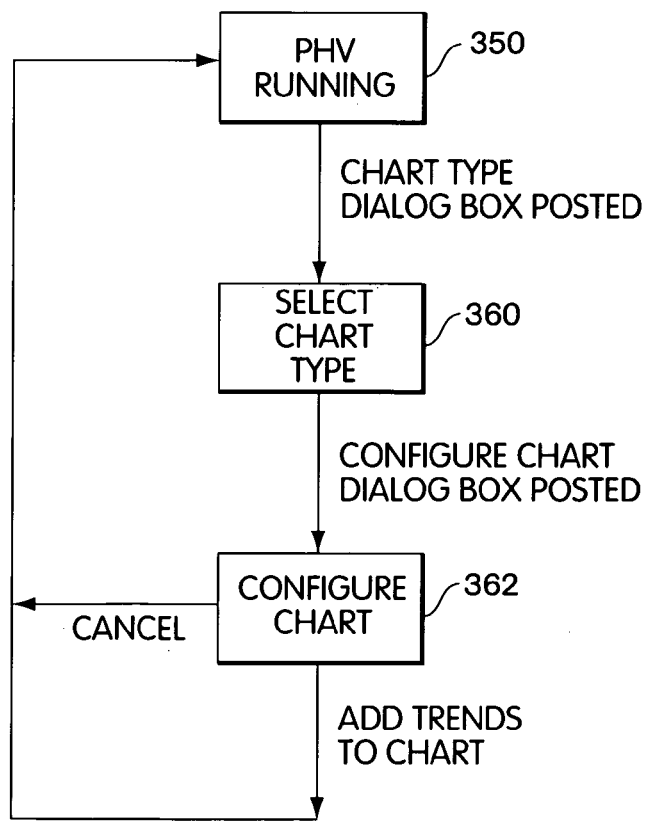
FIG. 8 is a flow chart that illustrates configuration of a new process history chart.

A flow chart illustrating opening of a previously-configured process history chart is shown in FIG. 7. The process history view application is indicated to be running in step 350. In step 352, the user selects a chart file, and the file is opened. For each process parameter specified by the trend chart configuration, the trend data is automatically retrieved from the appropriate source, such as the trend database 304 or the runtime database 306, and the data type, integer, floating point or ASCII, is automatically determined. In addition, the process event records are automatically retrieved from the event database 302. The requested process history chart is then generated without further action by the user. A flow chart of a process for configuring a new process history chart is shown in FIG. 8. With the process history view application running, as indicated in step 350, the user selects a process history chart in step 360. The configure chart dialog box, shown in FIGS. 4A–4D and described above, is displayed. The user configures the trend chart in accordance with required parameters. For each selected process parameter in the trend chart configuration, the application automatically retrieves the required trend data from the trend database 304 or the runtime database 306 and determines the data type. The user may establish filter settings or may utilize the default filter settings for event records. The event records according to the selected filter settings or the default filter settings are automatically retrieved from the event database 302. The process history chart is then displayed in accordance with the selected configuration and filter settings.

Figure 9:
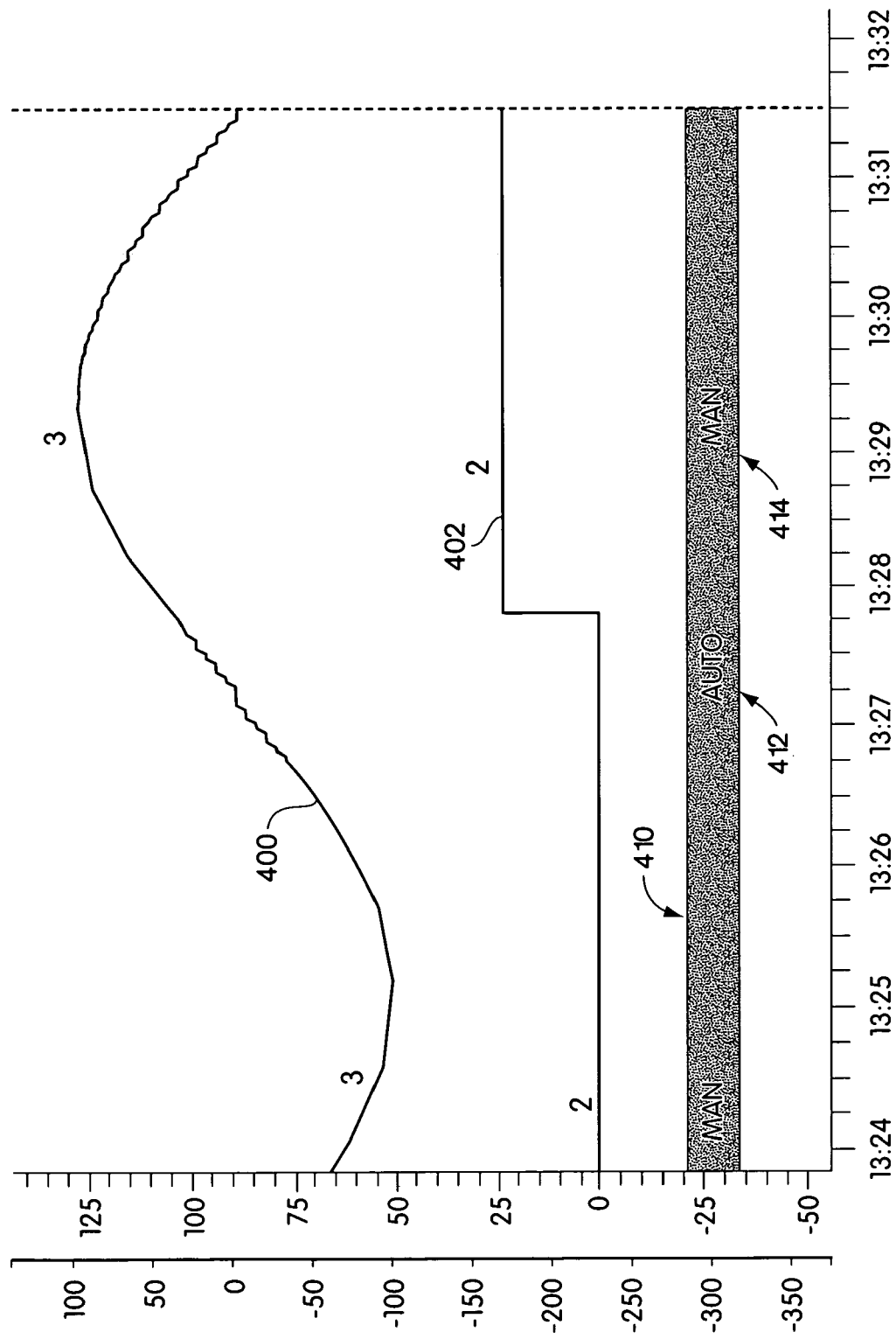
FIG. 9 is an example of a trend chart wherein ASCII data is displayed.

An example of a trend chart wherein ASCII strings represent process parameter values is shown in FIG. 9. Trend lines 400 and 402 indicate process parameter numerical values as described above. A trend line 410 indicates process parameter values in ASCII format. In particular, trend line 410 represents a process parameter as MAN (manual) or AUTO (automatic). Initially, trend line 410 indicates a parameter value of MAN. At a time indicated by a marker 412, the parameter value changes to AUTO. Then at a time indicated by a marker 414, the parameter value changes to MAN. In general, the ASCII trend line format uses two or more ASCII strings to indicate parameter values and uses markers to indicate the times when the parameter values change.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for displaying process information in a process control and/or monitoring system comprising a workstation having a display screen, a controller and an I/O subsystem, said workstation executing the steps of:
   generating and displaying on the display screen a trend chart containing values of one or more selected process parameters during a selected time window based on a user-defined trend chart configuration; and
   generating and displaying on the display screen an event table containing information describing process events that are related to the selected process parameters and that occurred during the selected time window, such that the event table and the trend chart may be viewed on the display screen at the same time.

2. The method of claim 1, further comprising a step of:
   displaying event markers on the trend chart, the event markers being indicative of events from the event table and the respective times of the events.

3. The method of claim 1, wherein the trend chart is a line graph.

4. The method of claim 1, further comprising a step of:
   saving trend chart configuration information in the workstation for later use.

5. The method of claim 4, further comprising a step of:
   selecting, before the step of generating and displaying the trend chart, information associated with configuration of at least one trend chart saved in the workstation.

6. The method of claim 2, further comprising the steps of:
   selecting at least one of the event markers displayed on the trend chart; and
   highlighting, on the event table, the event associated with the selected event marker.

7. The method of claim 2, further comprising the steps of:
   selecting at least one of the events displayed in the event table; and
   highlighting the event marker associated with the event on the trend chart.

8. The method of claim 2, wherein the step of displaying the event markers includes a step of displaying the event markers as event names.

9. A process control and/or monitoring system comprising:
   a process controller;
   an I/O subsystem; and
   a workstation having a display screen, said workstation comprising:
      means for generating and displaying on the display screen a trend chart containing values of one or more selected process parameters during a selected time window based on a user-defined trend chart configuration; and
      means for generating and displaying on the display screen an event table containing information describing process events that are related to the selected process parameters and that occurred during the selected time window, such that the event table and the trend chart may be viewed on the display screen at the same time.

10. The system of claim 9, further comprising:

means for generating and displaying event markers on the display screen, the event markers being indicative of events from the event table and the respective times of the events.

11. The system of claim 9, further comprising:

means for saving trend chart configuration information for later use.

12. The system of claim 11, further comprising:

means for selecting the saved trend chart configuration information for use by the means for generating and displaying the trend chart.

13. The system of claim 9, further comprising:

means for highlighting an event marker displayed on the trend chart in response to selection of a process event displayed on the event table and associated with the event marker.

14. A graphical user interface for displaying trend and event data related to the operation of a process, the interface comprising:

a first display area configured to display at least one trend line representative of at least one parameter associated with the process;

a second display area configured to display information representative of at least one process event; and event markers related to the at least one process event and displayed on the first display area.

15. The graphical user interface of claim 14, wherein the first display area includes more than one trend graph and a separate y-axis scale for each of the more than one trend graphs.

16. The graphical user interface of claim 14, wherein the information representative of the process events includes a time of occurrence of each of the at least one process event.

17. A system for monitoring a process comprising:

an event database containing event records related to the process;

a trend database containing historical trend data related to the process;

means for simultaneously displaying a trend graph representing at least a portion of the historical trend data and a table representing at least a portion of the event records, wherein the table displays event records related to the portion of the historical trend data being displayed on the trend graph.

18. The system of claim 17, further comprising means for selecting which portion of the trend data and the event records are displayed.

19. The system of claim 18, wherein the specified portion is a time interval having a start time and an end time.

20. The system of claim 17, further comprising:

means for displaying, on the trend graph, event markers that are related to the event records.

21. The system of claim 17, further comprising:

a run time database containing current trend data; and means for displaying the current trend data on the trend graph.

22. The system of claim 17, further comprising:

means for configuring the trend graph; and a chart file containing trend graph configuration information and filter settings from previously developed trend graphs, the chart file being used by the means to configure the trend graph to configure the trend graph.

23. A system to coordinate and display information related to a process variable comprising:

a workstation including a display screen;

a first display region on the display screen that displays process trends related to the process variable; and a second display region on the display screen that displays a table of event records related to the process variable.

24. The system of claim 23, further comprising:

event markers displayed in the first display region;

means for linking at least a portion of the table of event record to at least a portion of the event markers.

* * * * *

UNITED STATES PATENT AND TRADEMARK OFFICE
CERTIFICATE OF CORRECTION

| | | |
|---|---|---|
| PATENT NO. | : 7,023,440 B1 | Page 1 of 1 |
| APPLICATION NO. | : 09/378969 | |
| DATED | : April 4, 2006 | |
| INVENTOR(S) | : Robert B. Havekost et al. | |

It is certified that error appears in the above-identified patent and that said Letters Patent is hereby corrected as shown below:

<u>Title page,</u>
Item [75], Cindy A. Scott should be added as inventor.

Signed and Sealed this

Fourth Day of July, 2006

JON W. DUDAS
*Director of the United States Patent and Trademark Office*